United States Patent [19]

Schaill et al.

[11] Patent Number: 5,088,068
[45] Date of Patent: Feb. 11, 1992

[54] HAND-HELD UNDERWATER DISTANCE MEASUREMENT DEVICE

[75] Inventors: William S. Schaill, Wilton; James E. Richardson, Weston, both of Conn.

[73] Assignee: Littoral, Inc., Wilton, Conn.

[21] Appl. No.: 621,803

[22] Filed: Dec. 4, 1990

[51] Int. Cl.$^5$ .............................. H04R 15/00
[52] U.S. Cl. ................... 367/173; 181/124
[58] Field of Search ............... 181/123, 124; 367/99, 367/107, 108, 111, 141, 173, 910

[56] References Cited

U.S. PATENT DOCUMENTS

| | | |
|---|---|---|
| 2,935,728 | 5/1960 | Morgan . |
| 3,123,798 | 3/1964 | Holloway et al. . |
| 3,150,346 | 9/1964 | Polly et al. ................ 367/910 X |
| 3,740,706 | 6/1973 | Joseph ........................... 367/173 |
| 3,752,431 | 8/1973 | McBride . |
| 3,986,161 | 10/1976 | MacKellar ................. 367/910 X |
| 4,152,690 | 5/1979 | Veatch . |
| 4,281,404 | 7/1981 | Morrow et al. . |
| 4,282,590 | 8/1981 | Wingate . |
| 4,285,484 | 8/1981 | Burke . |
| 4,485,462 | 11/1984 | Wiegner . |
| 4,935,906 | 6/1990 | Baker .......................... 367/111 |

Primary Examiner—Brian S. Steinberger
Attorney, Agent, or Firm—David P. Gordon

[57] ABSTRACT

A hand-held underwater distance measurement device has a first end having a waterproof housing which houses a digital display and a suitable electronics package, a second end housing a transceiver, a middle section having a pair of rectangular telescoping rigid tubes with a spring lock clip for fixing the relative locations of the tubes at two or more locations via the provision of holes in each of the tubes, and a flexible conductor for coupling the transceiver and the electronics package. The upper of the pair of telescoping rigid tubes is mechanically coupled to the waterproof housing, while the lower of the pair is coupled to the transceiver, which in one embodiment is rotatable relative to the lower tube to permit horizontal scanning. In using the device, the transceiver is immersed at least six inches below the water surface while grasping the device by a hand grip located just below the electronics package housing. If length adjustment is required, the spring lock clip securing the telescoping tubes is released by momentarily depressing the pins of the clip. The lower tube is then slid into or out of the upper tube until the clip pins engage other holes in the upper tube, at which time the lower telescoping tube will lock itself relative to the upper tube. If additional adjustment is required, the procedure is repeated until the desired length is obtained. Then, distance measurements may be obtained.

20 Claims, 3 Drawing Sheets

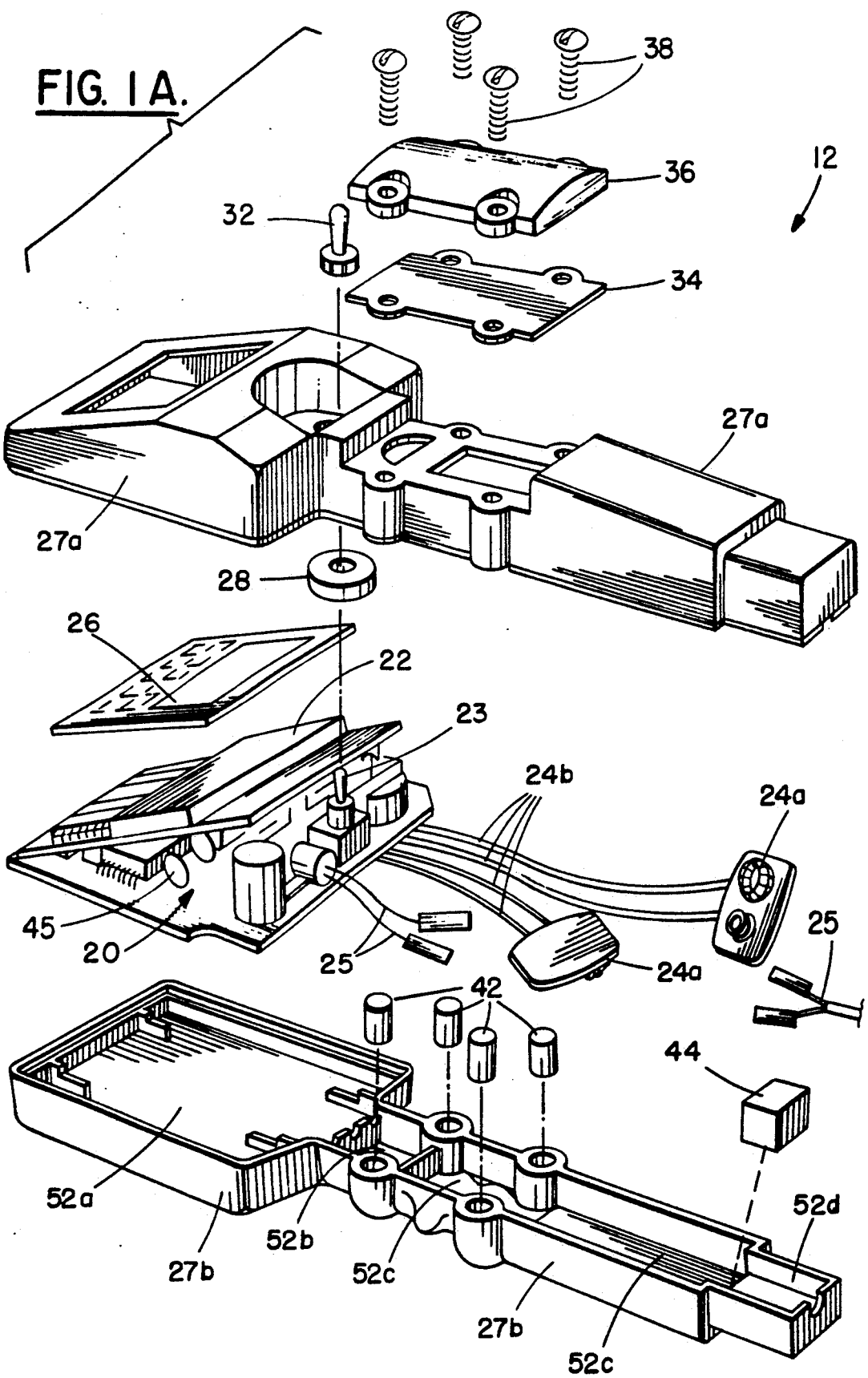

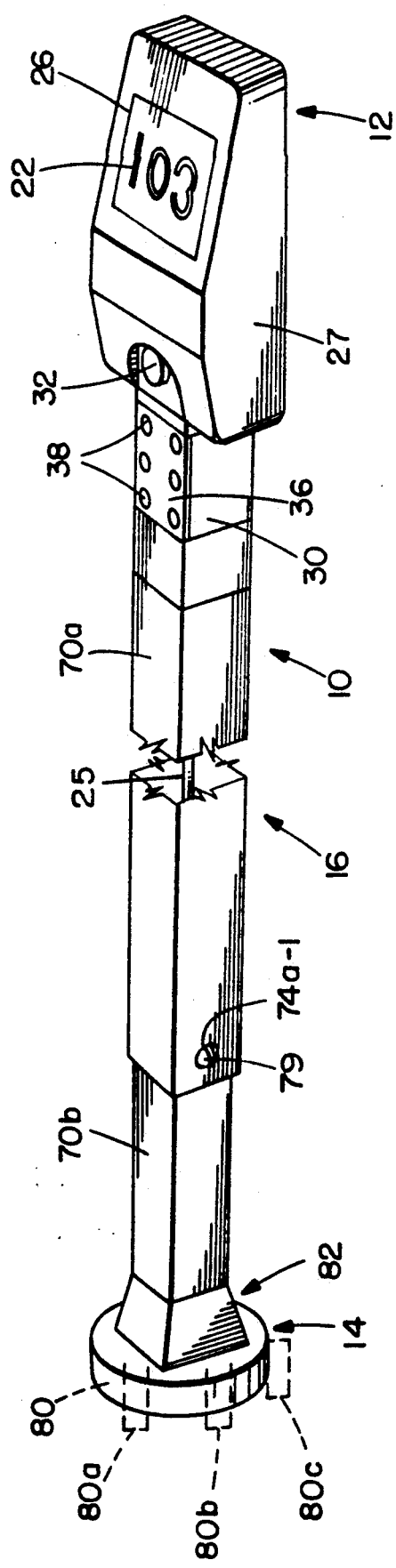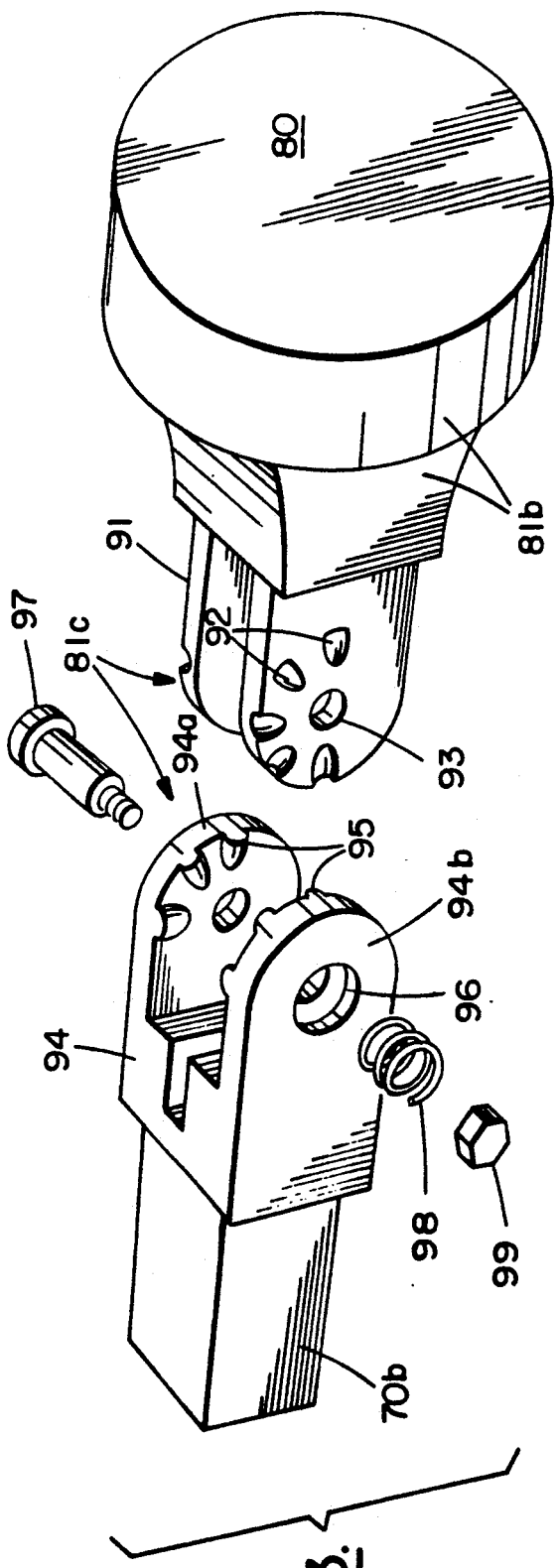

HAND-HELD UNDERWATER DISTANCE MEASUREMENT DEVICE

BACKGROUND OF THE INVENTION

The present invention relates to underwater distance measurement devices. More particularly, the present invention relates to portable, hand-held devices for measuring underwater distances such as surface to floor distances.

Boating, fishing, and diving enthusiasts often desire or require information regarding water depth and/or distances to submerged objects. Toward that end, various sonar measurement devices for mounting on boats have been proposed, including devices disclosed in U.S. Pat. Nos. 3,752,431 to McBride, 4,152,690 to Veatch, 4,282,590 to Wingate, and 4,285,485 to Burke. While the proposed devices are generally effective for obtaining desired measurements, they suffer from the requirement that they be permanently or semipermanently mounted on a boat at particular locations on the boat. The mounting location, however, may be inconvenient in many circumstances. Moreover, by requiring (semi-) permanent mounting, the devices are subject to theft, accidental damage (especially on small vessels), or at the very least, continued inconvenient mounting and dismounting procedures.

Portable, hand-held sonar-type depth determination apparatuses overcome many of the problems of the mounted devices of the art. Examples of such portable devices include U.S. Pat. Nos. 2,935,728 to Morgan, 3,123,798 to Holloway et al., and 4,281,404 to Morrow, Jr., et al. In particular, the Morrow, Jr. et al. patent discloses a hand-held, pistol shaped depth finding apparatus having a transducer, an electronics package with a liquid crystal display, and a electromechanical trigger. The water depth is found by immersing the barrel end of the pistol shaped device, pressing the trigger, and reading the depth on the LCD which is mounted where the hammer would be on a hand-held firearm.

While overcoming some of the problems of the art, the existing hand-held depth determination devices introduce additional problems. For example, in the Morrow, Jr. et al. device, the close proximity of the handle having the trigger to the transducer end of the barrel makes it highly possible, if not probable, that the handle will become wet and be difficult to hold, and that the user's hand and arm will have to be immersed in cold or foul water. Also, due to the length of the prior art device, and due to the fact that its LCD is mounted such that the user's eyes must be directly behind the device to read it, the user will have to hang over the side of all but the smallest vessel to use the device. Moreover, where the surface of the water is beyond arms length of the user, the hand-held device of Morrow, Jr. et al. will not be usable. Even where the water surface is close, accurate readings may not be obtained, as it has been found by the applicant hereof, that except in the calmest of seas, the transducer should be immersed to a depth of at least six inches below the surface of the water to avoid the rising of the transducer out of the water as the vessel rolls. Furthermore, in the Morrow, Jr. et al. device, the compartment containing the electronics package is directly connected with the compartment containing the batteries. While the entry to the battery compartment has a waterproof closure system, both water and water vapor can enter the battery compartment whenever the battery compartment is open to change batteries, or whenever the closure system fails. As a result, water and water vapor can enter the electronics package and cause the entire unit to fail permanently.

SUMMARY OF THE INVENTION

It is therefore an object of the invention to provide a hand-held underwater distance measurement device that has an adjustable length.

Another object of the invention is to provide a hand-held underwater distance measurement device that is waterproof.

A further object of the invention is to provide a hand-held underwater distance measurement device of adjustable length and which provides a readout readable at more or less right angles to the direction of measurement.

An additional object of the invention is to provide a hand-held underwater distance measurement device having a hermetically sealed electronics package which is not subject to water or corrosive salt water vapors.

Yet another object of the invention is to provide a hand-held underwater distance measurement device that can be used at night.

In accordance with the objects of the invention, a hand-held underwater distance measurement device is provided and generally includes a first end having a waterproof housing which houses a digital display and a suitable electronics package, a second end housing a transceiver, a pair of telescoping rigid tubes with at least one mechanism for changing and fixing the relative locations of the tubes, and a flexible conductor for coupling the transceiver and the electronics package. The upper of the pair of telescoping rigid tubes is mechanically coupled to the waterproof housing, while the lower of the pair is coupled to the transceiver.

According to one preferred aspect of the invention, the first end of the measurement device having the waterproof housing has two major compartments. A first compartment holds the digital display and a suitable electronics package and is hermetically and permanently sealed, while the second compartment houses the batteries used to power the device and is an openable compartment which is waterproof when properly closed. According to another preferred aspect, the mechanism for fixing the locations of the tubes is comprised of one or more spring loaded locking clips which are fixed in the lower tube. To accommodate the locking clips, the lower tube has holes through which the locking clips extend. Two or more sets of holes at two or more different heights along the long axis of the upper tube are also provided through which the locking clips extend. To avoid rotation of one telescoping tube relative to the other, the telescoping tubes are square, and the location of the holes in both tubes are arranged such that the locking clips may extend through holes in both tubes simultaneously, thereby locking the set of telescoping tubes relative to each other and providing a device of adjustable length.

In an alternative embodiment of the invention, the second end of the measurement device which houses the transceiver is rotatable relative to the telescoping tubes and may be fixed at an angle relative to the telescoping tubes (e.g. forty-five or ninety degrees). In this manner, short range horizontal measurements could be made, and the electronics package would include circuitry for making the device less sensitive to echoes such that sensor "noise" due to seaweed, bubbles, etc. would not provide false readings.

In using the hand-held underwater distance measurement device, it must first be determined if from the point of intended use the measuring device is long enough to reach the water. The device is long enough if it provides the ability to conveniently immerse the transceiver at least six inches below the water surface (preferably two feet for horizontal scanning) while grasping the device with one hand around the molded handle grip which is formed by the external surface of the battery compartment. If adjustment is required, the locking clip securing the lower telescoping tube relative to the upper tube is released by pushing in on it. By momentarily holding the locking clip down, the lower tube can then be slid into the upper tube if the device is to be shortened or slid out of the upper tube if the device is to be lengthened. When the locking clip reaches the next hole in the upper tube, the lower telescoping tube will lock itself relative to the upper tube. If additional adjustment is required, the procedure is repeated until the desired length is obtained. Then, distance measurement is obtained by toggling the on/off switch and permitting the transceiver and electronics to provide the results.

Additional objects and advantages of the invention will become apparent to those skilled in the art upon reference to the detailed description in conjunction with the accompanying drawings.

BRIEF DESCRIPTION OF THE DRAWINGS

FIGS. 1a and 1b together provide an exploded view of the hand-held underwater measurement device invention, with FIG. 1a showing the waterproof electronics housing section, and with FIG. 1b showing the telescoping tubes, spring pins and transceiver;

FIG. 2 is a perspective view of the hand-held underwater measurement device of the invention; and FIG. 3 is an exploded view of a second embodiment of the bottom section of the hand-held underwater measurement device invention which permits horizontal scanning.

DETAILED DESCRIPTION OF THE INVENTION

Figure 1B:
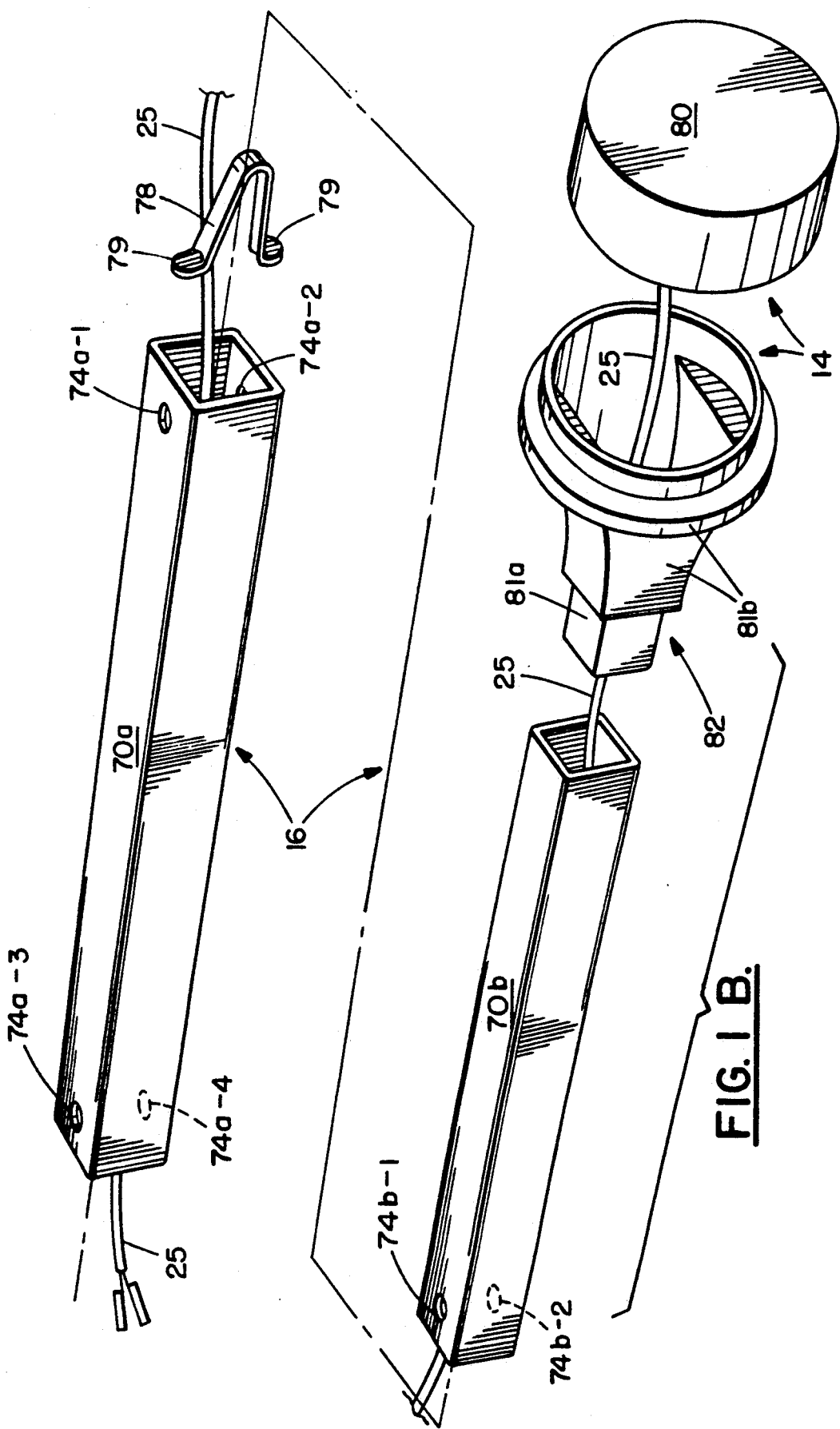

As seen in FIGS. 1a, 1b, and 2, the portable, hand-held water depth measurement device 10 of the invention is comprised of three primary sections: an upper section 12 for housing electronics and batteries, a lower section 14 for housing a transceiver 80, and a middle portion 16 having telescoping tubes 70. The upper section 12 has an electronics package 20 which includes a liquid crystal display (LCDs) 22 which is preferably angled relative to the long axis of the middle portion 16. The angle at which the LCDs 22 are placed is chosen to permit the user to view the LCDs while the measurement device 10 is making measurements. The upper section 12 of the measurement device 22 also includes a toggle switch 23, 9 V battery connectors 24a and connector wires 24b, a transceiver cable 25, a window 26 for the LCDs, a molded casing 27a and 27b, a rubber toggle switch gasket 28, a toggle switch boot 32, a battery section gasket 34, a battery cover 36, screws 38, screw receiving inserts 42, and a foam block 44.

The electronics package 20 of the upper section 12 may be any of several electronics packages known in the art which include a microprocessor (not shown). The electronics package 20 is provided to control the transceiver 80, the LCDs 22, and light emitting diodes 45 which are placed behind the LCDs 22 and are used for backlighting purposes (especially useful at night).

The molded casing 27a and 27b, which is preferably a single integral piece, forms several compartments A first compartment 52a is hermetically sealed and houses the electronics package 20. While compartment 52a does have a hole in it for permitting the toggle switch 23 to extend therethrough, the switch gasket 28 and boot 32 insure that compartment 52a is sealed. A second compartment 52b, through which the battery wires 24 b and the transceiver cable wires 25 extend, is injected (packed) with silicone so as to form a water and vapor-proof barrier for the electronics package 20 in compartment 52a. A third compartment 52c is provided to house one or more batteries (not shown) which are used to power the hand-held depth measurement device. At least a portion of the outer surface of compartment 52c is preferably shaped to form a handle grip. Located inside compartment 52c is a foam rubber block 44 which prevents excessive movement of the batteries. In order to insert the batteries, battery cover 36 is removed by first unscrewing screws 38 from inserts 42. The batteries may then be inserted by fitting them to battery connectors 24a and placing them in the battery compartment 52c. The battery compartment 52c is maintained relatively waterproof when the battery cover 36 is screwed back onto the casing 27, as the battery section gasket 34 is compressed between the inside of the battery cover 36 and the face of molded casing 27a.

Extending through the battery compartment 52c and into compartment 52d are the transceiver wires 25 which also extend through the telescoping tubes 70 before being coupled to the 200 Hz transceiver 80. Wires 25 are long enough to permit full extension of the middle portion 16 of the measurement device 10 of the invention as described below. However, wires 25 are also flexible to permit looping such as when middle portion 16 is not extended.

A final compartment 52d of the molded casing 27 is provided for purposes of mechanically coupling to the upper telescoping tube 70a of the middle portion 16 of the underwater measurement device 10. The outside shape of compartment 52d is important as it must fit with telescoping tube 70a to permit attaching thereto. Transceiver wires 25 extend through compartment 52d. Thus, in order to help waterproof the battery compartment 52c, compartment 52d is also preferably injected with silicone.

The middle portion 16 of the hand-held depth measurement device is comprised of a plastic or aluminum square hollow telescoping upper tube 70a, a plastic or aluminum square hollow telescoping lower tube 70b with an outer diameter slightly smaller than the inner diameter of the hollow upper tube 70a, and one or more locking clips 78. The upper hollow tube 70a has two open ends. The first open end extends around and is attached to compartment 52d of the waterproof housing 12. The bottom open end is arranged to receive the lower telescoping tube 70b. Towards the bottom end, holes 74a-1 and 74a-2, and toward the top end, holes 74a-3 and 74a-4 are provided on either side of the tube 70a to fix the upper telescoping tube 70a relative to the lower telescoping tube 70b as is described hereinafter. Additional sets of such holes in the upper telescoping tube can be provided during the manufacturing process or thereafter to fit specific needs.

The hollow lower telescoping tube 70b has two ends. The lower end is attached to a first portion 81a of a molded housing 82. A second portion 81b of the molded housing is arranged to receive and hold the transceiver 80, which may be any of many transceivers known for underwater depth measurement purposes. The upper end of the hollow lower telescoping tube 70b terminates in a hollow square open end which is always maintained inside upper telescoping tube 70a. At the upper end of the lower telescoping tube 70b are located holes 74b-1 and 74b-2 through which protrude the extension pins 79 of a spring loaded clip 78.

In order to connect telescoping tubes 70a and 70b at least one spring-loaded clip 78 is provided. Each spring-loaded clip 78 is provided with extension pins 79 which are dimensioned to extend through the holes in the telescoping tubes 70. In other words, the pins 79 have a diameter which is substantially the same as the inside diameter of holes 74, and a height which permits the pins 79 to project outward through the surface of tube 70b a distance substantially equal to the wall thickness of the upper tube 70a. The spring-loaded clips 78 are preferably fixed inside the lower telescoping tube 70b such that pins 79 always extend in the holes 74 b of the lower telescoping tube 70b. The projecting (top) ends of pins 79 are smoothly rounded to reduce friction between the pins 79 and the inner surface of outer tube 70a when tube 70b is being slid into or out of tube 70a.

Together, the spring-loaded clips 78, the holes 74 b in the inner telescoping tube 70b, and the multiple sets of holes 74a in the telescoping tube 70a comprise a locking system which allows the middle portion of the hand-held depth measurement device 10 to be adjusted for length. If several holes sets of holes 74a are provided, incremental adjustment may be made.

In using the hand-held water depth measurement device 10, a determination is made as to whether the device 10 is long enough to permit the transceiver 80 to be submerged by six inches of water. If the device 10 is not long enough, the length of the device can be adjusted by grasping the lower telescoping tube 70b near its upper end with a first hand, grasping the upper telescoping tube 70a or the upper section 12 (i.e. electronics housing) of the device 10 with a second hand, using the thumb and pointer finger of the first hand to depress the pins 79 extending through holes 74a-3 and 74a-4, and using relative movement between the two hands, sliding lower hollow telescoping tube 70b out of the upper tube 70a until pins 79 of the spring-loaded clip seat into holes 74a-1 and 74a-2 or into some intermediate set of holes (not shown). Where intermediate sets of holes in the outer telescoping tube 70a are provided, this procedure may be repeated as many times as desired, until the proper length adjustment is made.

Once the length of the device 10 is adjusted properly, the molded handle grip comprising the external surface of the battery compartment 52c of the device 10 is grasped with one hand. The device is lowered into the water so that transceiver 80 is approximately six inches below the water surface. The toggle switch boot 32 (and hence toggle switch 23) is toggled by moving it in a desired direction. When the switch 23 is toggled, the electronics package 20 generates an electronic pulse which travels down flexible conducting cable 25 to the transceiver 80 which then radiates a pulse into the water. After the pulse is radiated, the transceiver goes into receive mode and awaits the return echo. A return echo is created when the pulse propagated into the water by the transducer strikes the bottom or an underwater object. When the echo is received by the transceiver 80, the signal is transmitted up flexible conducting cable 25 to the electronics package 20. The electronics package converts the time interval between the pulse transmission and the receipt of the return echo into a distance with a dimension of feet. The distance is then displayed on the LCD display 22. The process is repeated as long as the momentary switch is held in the on position.

As indicated in FIG. 2, if desired, additional water characteristic sensors 80a, 80b, 80c . . . may be attached to transceiver housing 82 to measure the temperature, salinity, pH, turbidity, or other characteristic of the water in which the sensors are immersed. If such additional sensors are provided, additional wires are preferably added to transceiver cable 25 with the processor of the electronics package interrogating each sensor sequentially in time. Of course, the programming of the electronics package must be suitably altered to accommodate the additional functions.

Turning to FIG. 3, a second embodiment of the invention is seen where the bottom end of the measurement device which houses the transceiver 80 is rotatable relative to the telescoping tubes 70 and may be fixed at one or more angles relative to the telescoping tubes (e.g. forty-five or ninety degrees). In particular, the molded housing 82 includes the same portion 81b which receives and holds the transceiver 80, but a different portion or mechanism 81c for coupling to the lower telescoping tube 70b. In particular, mechanism 81c includes a male member 91 having dimples or depressions 92 and a hole 93 running perpendicular to the long axis of the telescoping tubes, a female member 94 having bumps or protrusions 95 and a hole 96 coaxial with hole 93, a bolt 97, spring 98 and lock nut 99. The male member 91 and female member 94 are arranged to mate such that the bumps or protrusions 95 of the female member engage the depressions 92 of the male member 91, and holes 93 and 96 align so that the bolt may be inserted therethrough. By providing five depressions 92 extending over one hundred and eight degrees, and three protrusions 95 extending over ninety degrees, the male member may assume angles of zero, forty-five, and ninety-degrees relative to the female member by rotating the male member around the bolt 97. Of course, by adding additional depressions, and/or by extending the depressions over three hundred sixty degrees, additional angles may be assumed.

The second embodiment of the measurement device 10 which has the rotatable transceiver (i.e. that of FIG. 3) is used in a manner very similar to that previously described (with reference to FIGS. 1a, 1b, and 2), except for a few minor changes. First, prior to placing the device in the water, the transceiver 80 is rotated relative to the telescoping tubes 70. Rotation is accomplished by holding the transceiver 80 in one hand, holding the telescoping tubes 70 in the other hand, and rotating one relative to the other. As the transceiver 80 is rotated, the protrusions 95 leave the depressions 92, and the prongs 94a and 94b of the female member 94 are pushed apart (counter to the force provided by the interaction of the bolt 97, spring 98, and lock nut 99) until the protrusions 95 engage a different set of depressions 92 and engage therewith. The relative positions between the transceiver 80 and the telescoping tubes 70 is maintained by the bolt 97, spring 98 and lock nut 99, as well as by the engagement of the protrusions 95 in the depressions 92.

A second change in method of use relates to the water depth into which the transceiver 80 of the measurement device 10 is lowered when the transceiver assumes an angle relative to the tubes 70. Preferably, where a ninety degree angle is assumed (horizontal scanning), the transceiver 80 is lowered two feet into the water. Where the transceiver provides a beam with a nine degree spread, the placing of the transceiver two feet under water permits the device to have a twenty to thirty foot horizontal range.

A third change in method of use also relates to a desirable change in the circuitry of the electronics package 20. In particular, where horizontal scanning is used, the device should be less sensitive to echoes such that sensor "noise" due to seaweed, bubbles, etc. would not provide false readings. Thus, a circuit which has a higher amplitude threshold (i.e. a less sensitive circuit) is used for the shorter range horizontal (or angled) situation. All valid echoes are preferably registered, rather than just the most distant, and a graphic, rather than digital, display which displays the ranges of all valid echoes is preferably used. Furthermore, the toggle switch 23 is preferably replaced with a three way switch, relating to a short range scan (horizontal), a long range scan (vertical), and an off position.

Where the transceiver 80 is angled relative to the telescoping tubes 70, depending upon the angle, either the short range or long range scan might be used. Of course, the electronics could also be modified to convert, via trigonometric functions, the angled range to a vertical and/or a horizontal distance range. An angle sensor, or other means for informing the electronics package of the angle utilized would be required to permit the appropriate trigonometric calculation to be made.

There have been described and illustrated herein underwater distance measurement devices. While particular embodiments of the invention have been described, it is not intended that the invention be limited thereby, as it is intended that the invention be as broad in scope as the art will allow. Thus, it is understood by those skilled in the art that locking means other than spring-loaded clips and complementary receiving holes could be utilized to establish a locking length-adjustable middle portion of the invention. For example, the upper and lower telescoping tubes could have a circular cross section, with the lower tube sliding inside the upper tube, and a friction locking means supplied by a threaded compression locking nut operating on the outside of the upper telescoping tube. Alternatively, the upper tube of a telescoping pair can slide inside the lower tube. In this case, the upper tube would have the incrementally placed spring-loaded clip(s) and the lower tube would have the complementary holes into which the spring-loaded clip(s) lock. It will also be appreciated that although a 200 Hz transceiver was described as the preferred embodiment, other transceivers with different frequencies may be usable to radiate and receive the pulses. Further, it will be appreciated that in order to avoid rotation of telescoping tubes, it is not required that the tubes be square; rather all that is required is that the tubes not be round. Moreover, while an underwater distance measurement device having only two telescoping tubes was described, it will be appreciated that a device having more than two telescoping tubes could be utilized. Also, it will be appreciated that other means for permitting rotation of the transducer relative to the telescoping tubes could be utilized, and that rotation could be permitted along two different axes to permit angled or horizontal scanning in different directions. Additionally, a magnetic or electronic datum and associated measuring system could be added to the electronics package such that when the device is being used for horizontal scanning, the entire device or only the transceiver thereof can be rotated relative to the points and the graphic display will display, in addition to ranges, the relative or absolute compass bearings to the objects detected. Therefore, it will be appreciated by those skilled in the art that yet other modifications could be made to the provided invention without deviating from its spirit and scope as so claimed.

I claim:

1. A hand-held underwater distance measurement apparatus for use by a user who is located substantially out of water, comprising:
    a) a distance display means;
    b) a housing for housing said distance display means;
    c) a transceiver;
    d) a plurality of telescoping rigid tubes with means for fixing and releasing the relative locations of at least two of said plurality of tubes at two or more locations, said housing being coupled to a first of said plurality of tubes, and said transceiver being coupled to a second of said plurality of tubes, at least a portion of said first of said plurality of tubes for gripping by said user, wherein when said user grips said portion of said first of said plurality of tubes and said portion is out of water, at least a portion of said second of said plurality of tubes and said transceiver are located in water;
    e) a flexible conductor means coupling said transceiver and said distance display means, wherein said flexible conductor means extends through said plurality of telescoping rigid tubes and is long enough to couple said transceiver and said distance display means when said plurality of telescoping rigid tubes are in their most extended position.

2. An apparatus according to claim 1, wherein:
    said housing comprises at least two adjacent compartments, including a first compartment for housing said distance display means, and a second compartment through which said flexible conductor means extends, said flexible conductor means extending from said second compartment into said first compartment, and
    said second compartment being silicone packed to effectively water and vapor-proof said first compartment.

3. An apparatus according to claim 2, further comprising:
    f) a power source means for said apparatus including a second conductor coupling said power source to said distance display means, wherein
    said housing comprises at least three compartments, a third compartment for housing said power source means, wherein said second conductor extends from said third compartment through said second compartment to said distance display means in said first compartment.

4. An apparatus according to claim 3, wherein:
    said distance display means comprises an electronic circuit means coupled to said flexible conductor means and to said second conductor, said electronic circuit means including means for causing said transceiver to transmit sonic pulses and for causing said transceiver to detect sonic signals and to transmit information relation to said sonic signals to said electronic circuit means via said flexible conductor means, and electronic display means for displaying distance information related to a distance traversed by said sonic pulses and said sonic signals.

5. An apparatus according to claim 1, wherein:
said distance display means comprises an electronic circuit means coupled to said flexible conductor means and to said second conductor, said electronic circuit means including means for causing said transceiver to transmit sonic pulses and for causing said transceiver to detect sonic signals and to transmit information relating to said sonic signals to said electronic circuit means via said flexible conductor means, and electronic display means for displaying distance information related to a distance traversed by said sonic pulses and said sonic signals.

6. An apparatus according to claim 1, wherein:
said means for fixing and releasing comprises at least one spring-loaded locking means, and
one of said first and second tubes has at least one hole, and the other of said first and second tubes has at least two holes, a first of said at least two holes being axially removed relative to a second of said at least two holes along a line parallel to a long axis of said plurality of tubes.

7. An apparatus according to claim 6, wherein:
said at least one spring-loaded locking means comprises at least one spring loaded clip, each spring loaded clip having two pins extending in opposite directions from each other.

8. An apparatus according to claim 7, wherein:
said tube having at least two holes axially removed has a first pair of holes one hundred eighty degrees apart along its walls at a first axial location, and a second pair of holes one hundred eighty degrees apart along its walls at a second axial location, and
said tube having at least one hole, has a pair of holes one hundred eighty degrees apart along its walls through which said pins of said spring loaded clip extend.

9. An apparatus according to claim 8, wherein:
said tube having at least two holes axially removed is said first of said tube which is coupled to said housing,
said tube having at least one hole is said second tube,
said first tube has an inner surface with an inner diameter, and
said second tube has an outer surface with an outer diameter, wherein said inner diameter is at least as large as said outer diameter.

10. An apparatus according to claim 4, wherein:
said means for fixing and releasing comprises at least one spring-loaded locking means, and
one of said first and second tubes has at least one hole, and the other of said first and second tubes has at least two holes, a first of said at least two holes being axially removed relative to a second of said at least two holes along a line parallel to a long axis of said plurality of tubes.

11. An apparatus according to claim 10, wherein:
said at least one spring-loaded locking means comprises at least one spring loaded clip, each spring loaded clip having two pins extending in opposite directions from each other.

12. An apparatus according to claim 11, wherein:
said tube having at least two holes axially removed has a first pair of holes one hundred eighty degrees apart along its walls at a first axial location, and a second pair of holes one hundred eighty degrees apart along its walls at a second axial location, and
said tube having at least one hole, has a pair of holes one hundred eighty degrees apart along its walls through which said pins of said spring loaded clip extend.

13. An apparatus according to claim 2, wherein:
said tube having at least two holes axially removed is said first of said tube which is coupled to said housing,
said tube having at least one hole is said second tube,
said first tube has an inner surface with an inner diameter, and
said second tube has an outer surface with an outer diameter, wherein said inner diameter is at least as large as said outer diameter.

14. An apparatus according to claim 1, wherein:
said plurality of telescoping rigid tubes comprises two hollow, substantially rectangular telescoping rigid tubes.

15. An apparatus according to claim 1, further comprising:
means for fixing said transceiver at an angle relative to the longitudinal axis of said telescoping rigid tubes.

16. An apparatus according to claim 4, further comprising:
means for fixing said transceiver at an angle relative to the longitudinal axis of said telescoping rigid tubes.

17. An apparatus according to claim 16, wherein:
said electronic display means comprises a liquid crystal display, and said apparatus further comprises,
g) light means for lighting said liquid crystal display, said light means being coupled to said power source means.

18. An apparatus according to claim 17, wherein:
said liquid crystal display is angled relative to a long axis of said telescoping rigid tubes.

19. An apparatus according to claim 5, further comprising:
f) at least one water characteristic sensor for sensing at least one characteristic of water chosen from a group of characteristics consisting of water temperature, water salinity, water pH, and water turbidity, said at least one water characteristic sensor located substantially adjacent said transceiver and coupled to said electronic circuit means via said flexible conductor means.

20. A hand-held underwater distance measurement apparatus for use by a user who is located substantially out of water, comprising:
a) a liquid crystal display means angled relative to a longitudinal axis of said hand-held underwater distance measurement apparatus;
b) a housing having at least two adjacent compartments, including a first compartment for housing said distance display means, and a second compartment being silicone packed to effectively water and vapor-proof said first compartment;
c) a transceiver;
d) first and second telescoping rigid tubes, one of said first and second tubes having at least one hole, and the other of said first and second tubes having at least two holes, a first of said at least two holes being axially removed relative to a second of said at least two holes along a line parallel to a long axis of said plurality of tubes, at least a portion of said first of said plurality of tubes for gripping by said user, wherein when said user grips said portion of said first of said plurality of tubes and said portion is out of water, at least a portion of said second of said plurality of tubes and said transceiver are located in water;

e) at least one spring loaded locking means for fixing and releasing the relative locations of said tubes at two or more locations, said housing being coupled to a first of said tubes, and said transceiver being coupled to a second of said tubes;

f) a flexible conductor means coupling said transceiver and said distance display means, wherein said flexible conductor means extends through said plurality of telescoping rigid tubes, and through said second compartment and into said first compartment, wherein said flexible conductor means is long enough to couple said transceiver and said distance display means when said plurality of telescoping rigid tubes are in their most extended position; and g) a power source means for said apparatus including a second conductor coupling said power source to said distance display means, wherein said distance display means comprises an electronic circuit means coupled to said flexible conductor means and to said second conductor, said electronic circuit means including means for causing said transceiver to transmit sonic pulses and for causing said transceiver to detect sonic signals and to transmit information relating to said sonic signals to said electronic circuit means via said flexible conductor means, and electronic display means for displaying distance information related to a distance traversed by said sonic pulses and said sonic signals.

* * * * *